UNITED STATES PATENT OFFICE.

PAUL W. TURNEY, OF WASHINGTON, DISTRICT OF COLUMBIA, ASSIGNOR, BY MESNE ASSIGNMENTS, TO ZELMA E. TURNEY, SURVIVING JOINT TENANT, OF WASHINGTON, DISTRICT OF COLUMBIA.

ICE-CREAM MIX AND PROCESS OF MAKING IT.

1,424,603.    Specification of Letters Patent.    Patented Aug. 1, 1922.

No Drawing. Application filed April 29, 1921, Serial No. 465,453. Renewed February 24, 1922. Serial No. 539,034.

*To all whom it may concern:*

Be it known that I, PAUL W. TURNEY, a citizen of the United States of America, residing at Washington, District of Columbia, have invented certain new and useful Improvements in Ice-Cream Mix and Processes of Making It, of which the following is a specification.

This invention relates to a process for producing a necessary element or product used in the manufacture or preparation of ice cream mix.

In the preparation of the ice cream mix as heretofore produced commercially, it has been found necessary to use artificial binders or fillers of various materials, in order to produce the desired consistency or mass of the mix, and of a character which will reasonably insure the finished ice cream product against the formation of ice crystals. There are comparatively few such artificial fillers that can be used with the high standard required by the various health departments, and such usable fillers are generally of a material of considerable expense and require considerable labor and time in their proper handling.

The present invention is based upon the production of what may be called a filler or binder through the use of a natural ice cream material to thus dispense entirely with any and all artificial binders or fillers.

Milk forms one of the important ingredients of an ice cream product, and as well known, casein is present in considerable proportion in milk. If the casein particles which are comparatively small can be materially increased in size and at the same time rendered jelly-like, there will be produced from a given quantity of the initial material a gelatinous-like mass, which, in addition to providing the necessary filler or binder for the ice cream mix, has the decided commercial advantage of being essentially made from the main material ordinarily used in making up the mix, and by introducing a very small proportion of alkali a semi-digested product is produced with distinctive dietetic advantages.

The essential step in the present process is the introduction into the milk or material of a comparatively small amount of alkali, and the sufficient agitation of the mixture following the introduction of the alkali to thus incorporate the alkali into the casein particles, thereby causing them to swell and develop a gelatinous character.

From experience developed, following a series of tests, it appears that the alkali so affects and changes the casein contents of the milk that, with the necessary agitation, there is produced a jelly-like matter which is obviously as pure as the milk itself, and thus adapted as a filler for introducing to the ice cream mix the necessary mass or consistency, and also being of such a character as to render the finished ice cream product practically immune to crystallization.

From the standpoint of a commercial utilization of the invention, it is found desirable to increase the proportion of the casein content in a part quantity of milk, and this may be readily provided for by reducing the fluidity of the milk, whether whole milk or skim milk, by any of the well known methods for this purpose. Furthermore, it has been found desirable to introduce the alkali in the form of an alkaline syrup solution, that is to say a mixture of lime, water, and granulated sugar in their proper relative proportions, this mixture being allowed to stand until the heat generated by the lime has dissipated. The proportion of this alkaline syrup solution that will be used, is extremely small, say for instance, one-fifth of an ounce of alkali to a gallon of the initial material and it will be found that the alkaline syrup solution, following the agitation of the mass, is so thoroughly combined with the casein that the presence of the lime or other alkali is imperceptible to the taste in the final product, there being only about 1/15 to 1/20 of an ounce of alkali to a finished gallon of ice cream.

It is to be noted that heat is absolutely unnecessary to the carrying out of the process, and while it is characteristic of the process that no heat is necessary, it has been found that during the agitation of the mixture, a gas is formed, which while undoubtedly giving off some heat in liberation, is nevertheless taken advantage of largely as a means for securing a more permanent and effective mixture of the casein particles and alkaline solution. The gas generated tends to an ebullition of the mass and thereby secures a more intimate searching of the casein by the alkaline solution, and to this extent the production of gas is a decided advantage.

The effect of the alkali on the casein is not necessarily immediately perceptible following the introduction of the alkali, in fact the swelling of the casein is dependent largely upon the degree and length of the agitating step. From this it will be apparent that substantially any degree of consistency of the mass can be obtained by the character and length of the agitating step or time the mass is agitated and allowed to stand. The mass produced is a direct result of the effect of the alkali on the casein, and as the alkali is substantially imperceptible in the finished mass, it is apparent that the filler thus provided is a natural filler for an ice cream mix in that the main or substantially all the material making up such filler is of a product necessary and forming a large part of an ice cream product.

The filler thus produced may be pasteurized and may, if necessary, be reduced to a milk powder by any of the well known methods of reduction, and thus stored as a filler capable of use for an ice cream mix or for other purposes for which such a product is desirable.

The filler described may be utilized immediately in the making of an ice cream mix, the other ingredients, such as cream, whole or skim milk, condensed milk, sugar and syrup, being added in the usual proportions for the product desired. If not intended for substantially immediate use, the improved product of this invention may be readily preserved substantially indefinitely for future use by the addition thereto of sugar as a preservative, or reduced to a powder for future use.

The essential steps therefore of the present process are increasing the proportion of casein contents in the whole or skim milk by reducing fluidity of such milk to the desired extent; adding to the reduced milk an alkali or alkaline syrup solution in a comparatively infinitesimal proportion of the whole; and then agitating the mass to render the same gelatinous to the degree desired.

What I claim is:

1. The method of making a filler for ice cream mix or the like, consisting in reducing the fluidity of the milk, adding thereto a proportion of alkali of such relatively small quantity as to be substantially imperceptible in the final product, and agitating the mixture to the consistency of a jelly.

2. The method of making a filler for ice cream mix or the like, consisting in reducing the fluidity of the milk, adding thereto an alkaline syrup solution in such small quantity as to be substantially imperceptible in the final product, and agitating the mixture to the consistency of a jelly.

3. The method of making a filler for ice cream mix or the like, consisting in reducing the fluidity of the milk, adding lime thereto in such relatively small proportion as to be imperceptible in the final product, and agitating the mixture to the consistency of a jelly.

4. A filler for ice cream mix, comprising a milk product of reduced fluidity, wherein the casein particles are brought to the consistency of a jelly by the addition to said milk product of an alkali in such proportion that said alkali will be imperceptible in the final product.

5. The method of making a filler for ice cream mix or the like, consisting in reducing the fluidity of the milk, adding thereto a proportion of alkali of such relatively small quantity as to be substantially imperceptible in the final product, and agitating the mixture.

In testimony whereof I affix my signature.

PAUL W. TURNEY.